United States Patent [19]

Porowski et al.

[11] Patent Number: 4,702,880
[45] Date of Patent: Oct. 27, 1987

[54] PROCESS FOR IMPROVING RESISTANCE OF SPLIT PINS TO STRESS CORROSION CRACKING

[75] Inventors: Jan S. Porowski; Manu L. Badlani, both of Pittsburgh; William J. O'Donnell, Bethel Park; Edward J. Hampton, Murrysville, all of Pa.

[73] Assignee: O'Donnell & Associates, Inc., Pittsburgh, Pa.

[21] Appl. No.: 882,256

[22] Filed: Jul. 7, 1986

[51] Int. Cl.⁴ .............................................. G21C 1/04
[52] U.S. Cl. .................................. 376/305; 148/130; 376/260; 376/353; 376/463; 376/900
[58] Field of Search ............... 148/130; 376/260, 305, 376/353, 463, 900

[56] References Cited

U.S. PATENT DOCUMENTS 3,770,256  11/1973  Godin et al. ..................... 148/130
4,512,820  4/1985  Mori et al. ........................ 376/900

OTHER PUBLICATIONS

An Official Journal of the Institution of Corrosion Science and Technology, vol. 25, No. 8/9, 1985.
Nuclear Engineering International, Nov. 1984, pp. 29–34.
Nuclear Engineering International, Jun. 1985, p. 19.

Primary Examiner—Deborah L. Kyle
Assistant Examiner—Richard W. Wendtland
Attorney, Agent, or Firm—Joseph J. Carducci

[57] ABSTRACT

A process for improving resistance of control rod guide tube split pins in nuclear reactors to stress corrosion cracking comprising heating the split pin to a critical elevated temperature level, cooling at least the surface portions of the split subject to stress corrosion cracking and then permitting the split pin to come to ambient temperature.

20 Claims, 4 Drawing Figures

TEMPERATURE TIME DIAGRAM 4,702,880

PROCESS FOR IMPROVING RESISTANCE OF SPLIT PINS TO STRESS CORROSION CRACKING

BACKGROUND OF THE INVENTION

1. Field of the Invention

This invention relates to a process for improving resistance of control rod guide tube split pins in nuclear reactors to stress corrosion cracking which comprises heating said split pin to a critical elevated temperature level, cooling at least the surface portions of the said split pin subject to stress corrosion cracking and then permitting said split pin to come to ambient temperature.

2. Description of the Prior Art

Split pins made of iron or alloys thereof are used in nuclear reactors to help position the control rod guide tube bottom flange in relation to the upper core plate and to provide lateral support and to maintain alignment of the guide tube with respect to the fuel assembly guide tube thimbles therein. Machining of these split pins during the manufacturing process results in split pins having high tensile residual stresses on the machined surfaces. When the split pins are assembled on the control rod guide tube bottom flange, and during the operation of the reactor, portions of the split pin develop further tensile stresses at various locations on said split pins. In a nuclear reactor these split pins are generally in a hostile environment, for example, in a pressurized water reactor wherein the water contains dissolved oxygen and chemicals that often remain even after the water has been demineralized. Under these circumstances those portions of the split pin that are under high tensile stresses are subject to stress corrosion cracking, particularly when such split pins are made of stainless steel or high nickel alloys. When this happens, the split pins so affected have to be removed and replaced with new split pins at great cost in time and money.

SUMMARY OF THE INVENTION

We have found that we can greatly improve resistance of control rod guide tube split pins used in nuclear reactors to stress corrosion cracking using a process which comprises heating said split pin to an elevated temperature level, cooling at least the surfaces of said split pin subject to stress corrosion cracking to a temperature below said elevated temperature level and then permitting said split pin to come to ambient temperature, said elevated temperature level being below the characteristic temperature resulting in metallurgical change in the material of said split pin but at least an elevated temperature level such that the difference between said elevated temperature level and the temperature to which said surface is initially cooled is sufficient to result in plastic flow of said initially cooled surface to a depth equivalent to at least one grain size.

DESCRIPTION OF THE PROCESS

Figure 1:
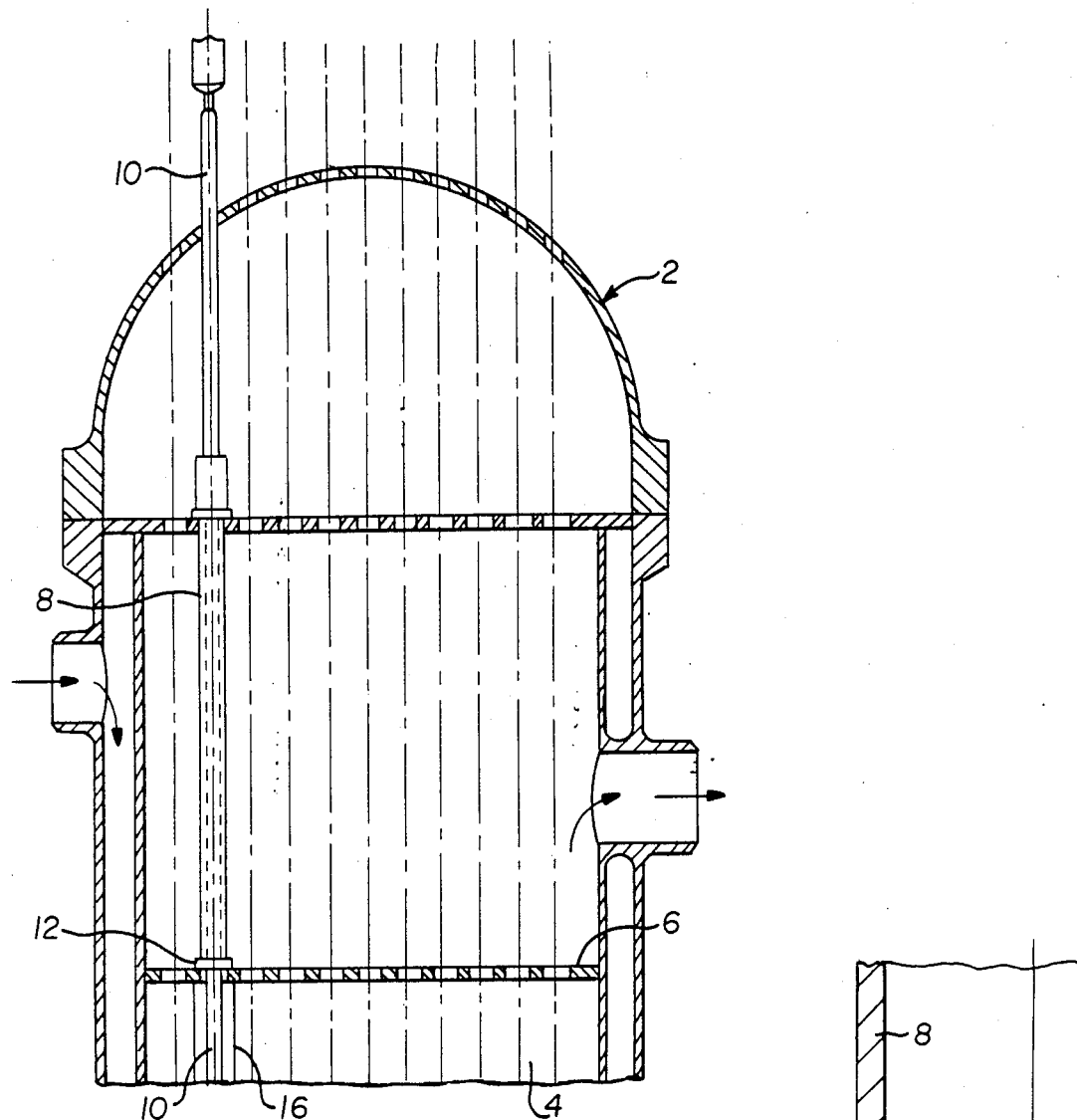
FIG. 1 is an elevational view, partly in section, of a nuclear reactor showing the environment in which the split pin is used.

Referring to FIG. 1, reference numeral 2 defines a nuclear reactor vessel, in the upper core 4 of which there is disposed core plate 6. A guide tube 8, through which control rod 10 is vertically movable, is provided with a bottom flange 12 fixedly attached thereto.

Figure 2:
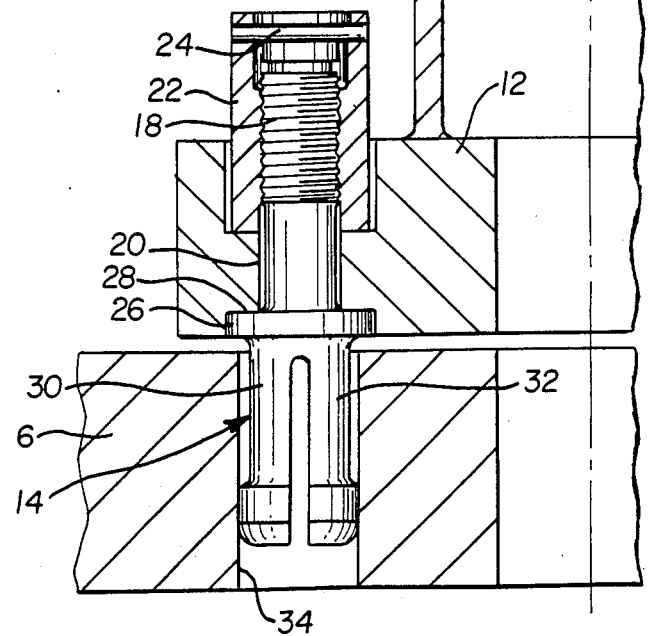
FIG. 2 is an enlarged elevational view, partly in section, of the split pin in operation.

Referring to FIG. 2, there is attached to bottom flange 12, a split pin 14 that serves to position guide tube 8 relative to core plate 6, to provide lateral support therefor and to maintain alignment of the guide tube 8 with fuel assembly guide thimble 16 shown in FIG. 1. The upper, threaded end 18 of split pin 14 fits upwardly through an opening 20 in bottom flange 12, and a cylindrical nut 22 is threaded thereon. A locking device 24 is mounted onto nut 22. Split pin 14 is provided with shoulder 26 for precision centering of the same in recess 28 on the underside of the bottom flange 12. In this way, split pin 14 is fixedly mounted to bottom flange 12. The lower portion of split pin 14 is provided with spring leaves 30 and 32 capable of engaging the wall of opening 34 in core plate 6. Thus, split pin 14 helps center guide tube 8 on core plate 6, provides lateral support for the control rod guide tube 8 and aids in maintaining alignment of control rod guide tube 8 with fuel assembly guide thimbles 16.

When reactor vessel 2 is filled with pressurized water containing dissolved oxygen and small amounts of chemicals, the adverse environment resulting therefrom gives rise to stress corrosion cracking in components under tensile stress, particularly in parts or materials composed of stainless steel or high nickel alloys, for example, 304 type stainless steel or Inconel X-750. Split pins 14 are generally made of Inconel X-750. In these pins high tensile stress can be found, for example, in the small radii fillets 36 and 38, crotch section 40 between spring leaves 30 and 32 and in the threads 42 (see FIG. 3). Exposure to water of those portions of split pin 14 which are under high tensile stress results in the initiation and then propagation of stress corrosion cracks 44 and finally in the failure of shank 46 and spring leaves 30 or 32. When this happens, the split pins so damaged must be replaced at great cost in time and money.

According to our invention, we remove tensile stresses and generate compressive stresses in the surface layers of split pins prior to exposure to a corrosive environment, thus, eliminating, or substantially reducing, their tendency to crack initiation. This is done by heating the split pin to a critical temperature level and then cooling at least the surface of those portions of the split pin under high tensile stress such that the material at those surface portions flows plastically in tension. Then when the split pin is brought back to ambient temperature, the residual tensile stresses have been removed and the surface material so treated remains under compression. When a split pin is so treated, it can safely be used in the environment described above without fear of crack initiation.

The first step in our process involves heating split pin 14 to an elevated temperature level, preferably throughout its bulk, but below the characteristic temperature resulting in metallurgical change in the material of the split pin. The elevated temperature to which the split pin is heated must, however, be sufficiently high such that the difference between said elevated temperature level and the temperature to which a surface thereof is initially cooled in the subsequent second step is sufficient to result in plastic flow of said initially-cooled surface to a depth equivalent to at least one grain size. The elevated temperature to which split pin 14 is heated will depend on a number of variables, such as the composition of the split pin, the depth to which plastic flow is desired after the heated split pin is cooled, etc. In general the temperature level to which the split pin is heated will lie in the range of about 400° to about 1,300° F. Thus, if the split pin is composed of Inconel, the elevated temperature can be in the range of about 800° to about 1,300° F. preferably about 900° to about 1,200° F. When stainless steel is used, the elevated temperatures can be in the range of about 400° to about 1,200° F., preferably from about 600° F. to about 1,000° F., and with carbon steel from about 400° to about 1,200° F., preferable from about 600° to about 800°.

Figure 3:
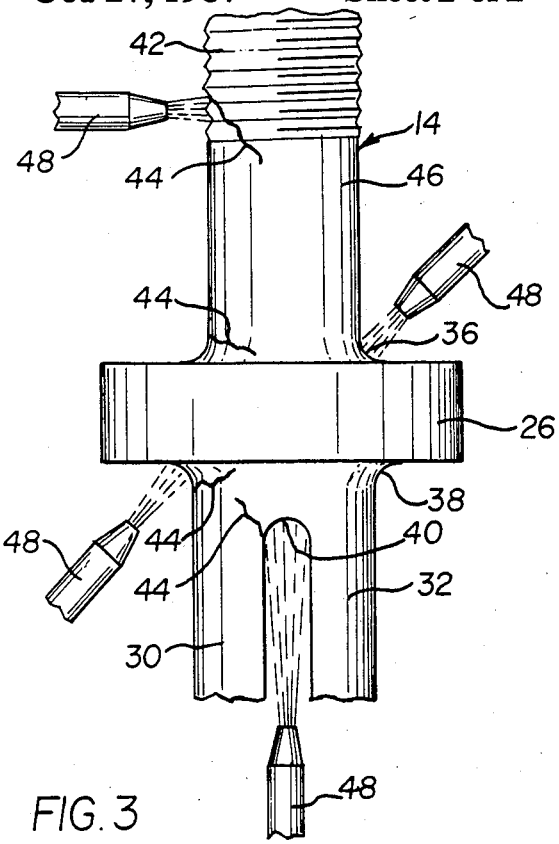
FIG. 3 is an elevational view of the split pin illustrating the preferred procedure for improving resistance of the split pin to stress corrosion cracking.

In the second step herein, the split pin, after being heated to the temperature level defined above, is surface cooled at those portions thereof that are under high tensile stress to a lower temperature level, such that the difference between the elevated temperature level and the temperature to which the surface is cooled in this second step is sufficient to result in plastic flow of the cooled surface to a depth equivalent to at least one grain size. The entire surface of the split pin can be cooled if desired, but in the preferred embodiment only those portions of the split pin that are endangered by stress corrosion cracking are subjected to cooling. To cool the desired surfaces of the split pin any suitable procedure can be used, for example, spraying with a liquid, such as water, mineral oil, etc., or immersing the heated split pin in a cooling liquid, such as water, mineral oil, etc. In a preferred embodiment, cooling is carried by spraying only those portions of the split pin endangered by stress corrosion cracking with water using spraying nozzles 48 as shown in FIG. 3. The temperature to which the selected surface of the split pin is cooled will also depend on many factors, such as the composition of the split pin, the depth of plastic flow desired on the surface of the split pin, etc. In general, the surface of the split pin that is cooled will be in the range of about ambient temperature (68° F.) to about 400° F., but more often between about ambient temperature and about 212° F. Cooling of said surface is continued until plastic flow is obtained in the surface thereof extending to a depth equivalent to at least one grain size, preferably in the range of about two to about fifty grain sizes of the material of which the split pin is composed, provided the plastic layer does not extend beyond about 10 percent of the shank diameter in the upper part of the split pin and about 10 percent of a leaf thickness in the lower part. Thus, the step of cooling said heated surfaces is terminated within about one second to about one minute, but in general cooling can be terminated within about 3 to about 30 seconds. It is critical that the above considerations be strictly adhered to, otherwise a deeper plastic surface layer will result, causing undesired rise of stresses in the central portion of the bulk material.

In the third step of the process, the cooling procedure used in the second step is terminated and the bulk material is permitted, by any suitable means, to come to ambient temperature, at which time the residual tensile stresses defined above are removed in the split pin and the treated surface material will be in compression. The treated split pin can then be safely used in a nuclear reactor without fear of initiating cracks in the critical portions of the split pin.

Figure 4:
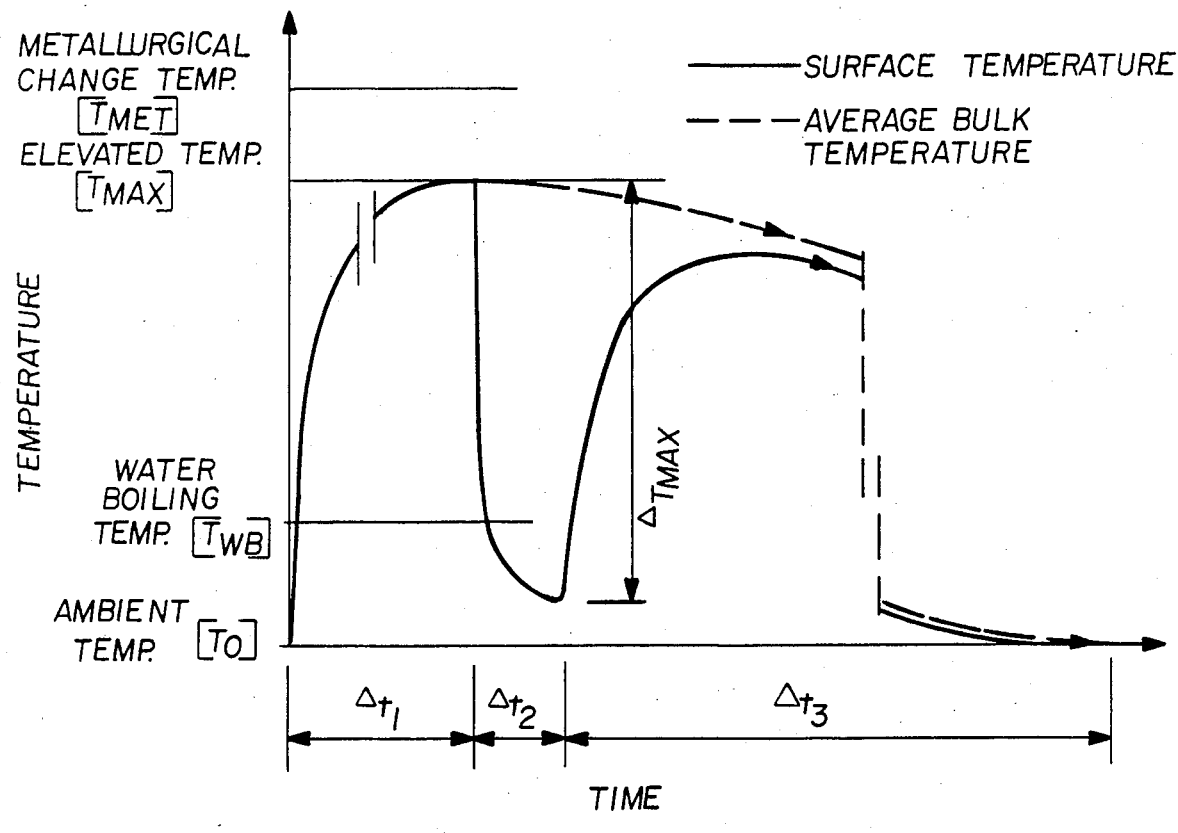
FIG. 4 is a temperature-time diagram of the process defined herein.

The temperature-time profile of the split pin during the claimed operation herein can be seen from FIG. 4, for example, when water is sprayed onto the surface of the split pin during the cooling procedure. During the time period $\Delta t_1$, the bulk material is heated to an elevated temperature level but below the temperature resulting in metallurgical change in the material of the split pin. At the beginning of time interval $\Delta t_2$, water is sprayed onto the heated surface of the split pin and the surface temperature quickly falls below the boiling point of water, but the temperature in the bulk of the split pin is little affected by the reduction in temperature of the cooled surface. When the cooling is terminated at the end of the interval $\Delta t_2$, the temperature of the surface quickly rises to approach the slowly-falling temperature of the bulk of the split pin and then each of the temperatures, surface and bulk, slowly falls to the same temperature level at the end of the interval $\Delta t_3$.

DESCRIPTION OF THE PREFERRED EMBODIMENT

A split pin having a length of 4.25 inches and an overall width of 1.125 inches, of a design similar to that shown in FIGS. 2 and 3, composed of Inconel X-750, is heated in a furnace for one-half hour until the bulk of the split pin is 900° F. The hot pin is removed from the furnace and the same sprayed with water at ambient temperature in the radii fillets 36 and 38, crotch section 40 and threads 42. The surface temperatures at each of these locations is brought to the boiling point of water of about 212° F. in about 0.5 seconds by such spraying. The temperature level of the surfaces is maintained at this level for a total of about 2.5 seconds by continued spraying. Spraying is then terminated, and the temperature of the surface then rises substantially to the temperature of the bulk over a period of about twelve seconds. The pin so treated is cooled in air over a period of one hour, at which time the total bulk of the pin is at ambient temperature. Inelastic finite element analysis conducted on the so-treated split pin shows that the material on the cooled surfaces flows plastically and the generated plastic strain is about 0.2 percent. The residual stresses generated at the cooled surfaces are about 80 ksi in compression. The depth of the layer of the material with generated compressive stresses in the cooled surfaces is about 20 mils, which falls within the preferred range defined herein. Extending the protective layer on the cooled surface beyond one grain will seal such surface and inhibit stress corrosion cracking thereof.

For purpose of this invention, "metallurgical change" is defined as phase change transformation wherein metal changes from one crystal structure to another or by a noticeable increase in grain size. Phase diagrams are available in the literature. For example, a phase diagram for Iron-Carbon is shown in *Elements of Physical Metallurgy* by Albert G. Guy, Addison-Wesley Publishing Company, Inc., Reading, Massachusetts, 1951, page 92. By "grain" we mean a portion of a metal or a metal alloy having a single orientation of space lattice. Grain therefore is a metal crystal with more or less irregular boundaries. By "stress corrosion cracking" we refer to intergranular or transgranular attack of steel subjected to tensile stress in a hostile environment, such as boiler feedwater.

Obviously, many modifications and variations of the invention, as defined herein, can be made without departing from the spirit and scope thereof, and, therefore, only such limitations should be imposed as are indicated in the appended claims.

We claim:

1. A process for improving resistance of control rod guide tube split pins, used in nuclear reactors, to stress corrosion cracking which comprises heating said split pin to an elevated temperature level, cooling at least the surfaces of said split pin endangered by stress corrosion cracking and therefore subject to stress corrosion cracking to a temperature below said elevated temperature and then permitting said split pin to come to ambient temperature, said elevated temperature level being below the characteristic temperature resulting in metallurgical change in the material of said split pin but at least an elevated temperature level such that the difference between said elevated temperature level and the temperature to which said surface is initially cooled is sufficient to result in plastic flow of said initially-cooled surface to a depth equivalent to at least one grain size.

2. The process of claim 1 wherein said elevated temperature is in the range of about 400° to about 1,300° F.

3. The process of claim 1 wherein said split pin is composed of Inconel and said elevated temperature is in the range of about 800° to about 1,300° F.

4. The process of claim 1 wherein said split pin is composed of Inconel and said elevated temperature is in the range of about 900° to about 1,200° F.

5. The process of claim 1 wherein said split pin is composed of stainless steel and said elevated temperature is in the range of about 400° to about 1,200° F.

6. The process of claim 1 wherein said split pin is composed of stainless steel and said elevated temperature is in the range of about 600° to about 1,000° F.

7. The process of claim 1 wherein said split pin is composed of carbon steel and said elevated temperature is in the range of about 400° to about 1,200° F.

8. The process of claim 1 wherein said split pin is composed of carbon steel and said elevated temperature is in the range of about 600° to about 800° F.

9. The process of claim 1 wherein said surfaces of said heated split pin are initially cooled to a temperature ranging from about ambient temperature to about 400° F.

10. The process of claim 1 wherein said surfaces of said heated split pin are initially cooled to a temperature ranging from about ambient temperature to about 212° F.

11. The process of claim 9 wherein said initial cooling is terminated within about one second to about one minute.

12. The process of claim 10 wherein said initial cooling is terminated within about 3 to about 30 seconds.

13. The process of claim 1 wherein the difference between said elevated temperature and the temperature to which said surface is initially cooled is sufficient to result in plastic flow of said surface to a depth equivalent to about two to about fifty grain sizes.

14. The process of claim 1 wherein said initial cooling of said surfaces is obtained by spraying a liquid thereon.

15. The process of claim 14 wherein said liquid is water.

16. The process of claim 1 wherein said split pin is heated to a temperature in the range of about 400° to about 1,300° F., said surfaces are initially cooled to a temperature ranging from about ambient temperature to about 400° F. by spraying a liquid thereon, terminating said spraying, whereby the temperature of said surfaces increases to approach the temperature of the bulk of said split pin, and then permitting said pin to come to ambient temperature, so that the depth of said plastic flow is in the depth-equivalent range of about two to about fifty grain sizes.

17. The process of claim 16 wherein said split pin is composed of Inconel and said elevated temperature is in the range of about 800° to about 1,300° F.

18. The process of claim 16 wherein said split pin is composed of Inconel and said elevated temperature is in the range of about 900° to about 1,200° F.

19. The process of claim 17 wherein said liquid is water.

20. The process of claim 18 wherein said liquid is water.

* * * * *